United States Patent
Yang

(10) Patent No.: US 11,054,582 B2
(45) Date of Patent: Jul. 6, 2021

(54) MOUNTING STRUCTURE OF OPTICAL CONNECTOR RECEPTACLE AND OPTICAL CONNECTOR RECEPTACLE MODULE THEREOF

(71) Applicant: PROTAI PHOTONIC CO., LTD., Taipei (TW)

(72) Inventor: Jyh-Cherng Yang, Taipei (TW)

(73) Assignee: PROTAI PHOTONIC CO., LTD., Taipei (TW)

( * ) Notice: Subject to any disclaimer, the term of this patent is extended or adjusted under 35 U.S.C. 154(b) by 0 days.

(21) Appl. No.: 16/933,452

(22) Filed: Jul. 20, 2020

(65) Prior Publication Data

US 2021/0124128 A1 Apr. 29, 2021

Related U.S. Application Data

(60) Provisional application No. 62/926,452, filed on Oct. 26, 2019.

(51) Int. Cl.
*G02B 6/36* (2006.01)
*G02B 6/38* (2006.01)

(52) U.S. Cl.
CPC ......... *G02B 6/3644* (2013.01); *G02B 6/3897* (2013.01); *G02B 6/3652* (2013.01)

(58) Field of Classification Search
None
See application file for complete search history.

(56) References Cited

U.S. PATENT DOCUMENTS

| | | | | |
|---|---|---|---|---|
| 9,383,523 B2 * | 7/2016 | Liu | ................ | G02B 6/3893 |
| 10,700,479 B1 * | 6/2020 | Smith | ................ | H01R 13/745 |
| 2005/0058402 A1 * | 3/2005 | Ernst | ................ | G02B 6/4277 |
| | | | | 385/56 |
| 2006/0169856 A1 * | 8/2006 | Dorenkamp | ......... | G02B 6/3897 |
| | | | | 248/231.9 |
| 2010/0278497 A1 * | 11/2010 | Hsu | ................ | G02B 6/3825 |
| | | | | 385/134 |
| 2013/0101257 A1 * | 4/2013 | Lin | ................ | G02B 6/3825 |
| | | | | 385/76 |
| 2015/0234128 A1 * | 8/2015 | Wong | ................ | G02B 6/3825 |
| | | | | 385/134 |
| 2015/0234131 A1 * | 8/2015 | Tseng | ................ | G02B 6/3849 |
| | | | | 385/56 |
| 2017/0299821 A1 * | 10/2017 | Weiland | ................ | G02B 6/3897 |
| 2020/0132944 A1 * | 4/2020 | Wong | ................ | G02B 6/3825 |

* cited by examiner

*Primary Examiner* — Jerry Rahll
(74) *Attorney, Agent, or Firm* — WPAT, PC

(57) ABSTRACT

The present invention provides a mounting structure of an optical connector receptacle for fixing the optical connector into a through hole of a metal housing. The mounting structure has a main plate leaning against a first surface of the receptacle, and a pair of side plate portions leaning against two second surfaces respectively connected to the first surface. Each side plate portion comprises a first side plate connected to the main plate, a connecting plate having one side connected to the first side plate, and a second side plate connected to another side of the connecting plate so that an indentation structure is formed, wherein the first side plate or the second side plate has a first extending element lean against a housing of the receptacle. In another embodiment, an optical connector module comprises the mounting structure and the optical connector receptacle.

28 Claims, 8 Drawing Sheets

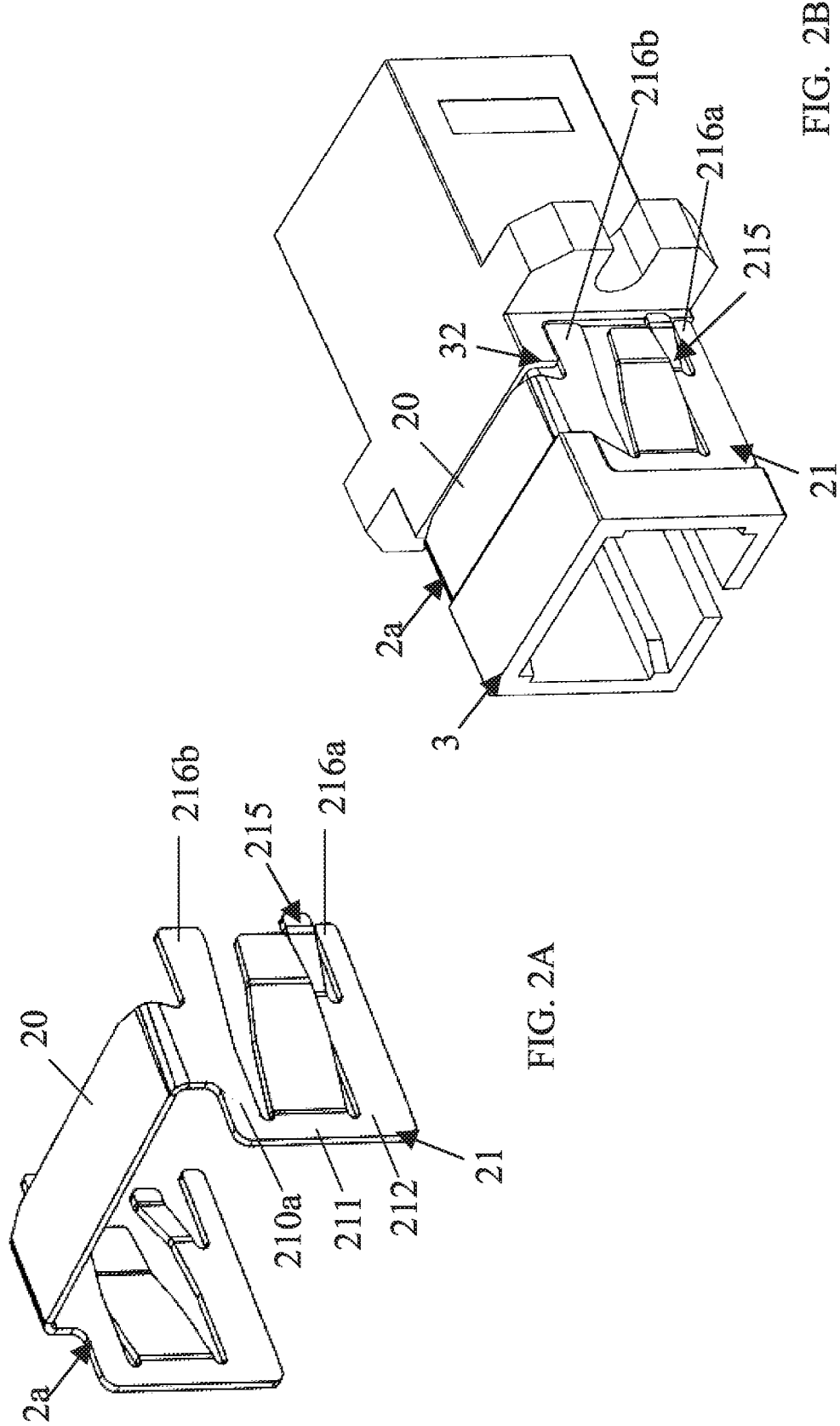

MOUNTING STRUCTURE OF OPTICAL CONNECTOR RECEPTACLE AND OPTICAL CONNECTOR RECEPTACLE MODULE THEREOF

CROSS-REFERENCE TO RELATED APPLICATION

This application claims the benefit under 35 U.S.C. § 119(e) to the U.S. provisional patent application having the Ser. No. 62/926,452 filed on Oct. 26, 2019, the entirety of which is incorporated herein by reference.

FIELD OF INVENTION

The present invention relates to a mounting structure applied in an optical connector receptacle. In particular, it relates to the mounting structure of the optical connector receptacle and an optical connector receptacle module thereof disposed and fixed in a through hole of a metal housing to avoid tilting the optical connector receptacle.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100G optical module communication is not enough, and the future will be expected to move towards the era of 400G optical module communications.

In the field of 400G optical communications, there are also many designs for the packaging design of optical fiber modules, one of which is called Quad Small Form Factor Pluggable-Double Density (QSFF-DD). The specification, with a downward compatible design, has attracted the attention of many large manufacturers, and has launched corresponding specifications of optical communication module products.

In the conventional technology, the optical communication module has a connector for maintaining the position of the optical fiber, and an optical connector receptacle which is inserted by the connector. The connector has an optical fiber holding structure, which is used to keep the optical fiber in the same plane. The receptacle has insertion holes on both sides which are inserted by the optical connector, so that the optical fibers in the optical connector can be correspondingly coupled together.

In order to facilitate the installation of the optical connector receptacle on the metal housing of the communication device, a metal piece would be set on the optical connector receptacle as a mounting structure for fixing the optical connector receptacle in the through hole of the metal housing. In the conventional technology, there are various mounting structure designs. For example, one conventional technology disclosed an optical adaptor mounting metal fittings and an optical adaptor, comprising a joining plate, and an elastic engagement member extending longitudinally toward a plane of the joining plate; wherein the elastic engagement member is disposed at an inclined angle relative a common plane of the respective one of side plates to extend inwardly toward an opposing one of side plates.

The above information disclosed in this section is only for enhancement of understanding of the background of the described technology and therefore it may contain information that does not form the prior art that is already known to a person of ordinary skill in the art.

SUMMARY OF THE INVENTION

The present invention provides a mounting structure of an optical connector receptacle, which is used for embedding and fixing the optical connector receptacle in a through hole of a housing of a communication device. The present invention has an abutment structure arranged toward the wall surface of the through hole on both sides of the mounting structure and located in the through hole of the housing, so as to provide an average power for the optical connector and produce a stable fixing effect. In addition, in another embodiment, one of the abutment structures has an extending element that can provide balanced and stable support, so that the mounting structure can be more stably fixed on the optical connector.

In one embodiment, the present invention provides a mounting structure of an optical connector receptacle, for fixing the optical connector receptacle into a through hole of a metal plate, the optical connector receptacle comprises a first surface, and second surfaces respectively connected to two sides of the first surface, comprising: a main plate, leaned against the first surface; and a pair of side plate portions, connected to two sides of the main plate respectively, the pair of side plate portions leaned against the second surface, each the side plate portion comprising: a first side plate, connected to the main plate; a connecting plate, an end of the connecting plate connected to the first side plate; and a second side plate, connected to another end of the connecting plate, an indentation structure formed between the first side plate and the second side plate; wherein a first extending element formed on the first side plate or the second side plate leans against a housing of the optical connector receptacle.

In another embodiment of the present invention, the present invention also provides an optical connector receptacle module, comprising: an optical connector receptacle, having a first surface, and second surfaces respectively connected to two sides of the first surface; a mounting structure, fixed the optical connector receptacle into a through hole of a metal plate, the mounting structure having a main plate and a pair of side plate portions, the main plate leaned against the first surface, and the pair of side plate portions respectively connected to two sides of the main plate and leaned against the second surface, each the side plate portion comprising: a first side plate, connected to the main plate; a connecting plate, an end of the connecting plate connected to the first side plate; and a second side plate, connected to another end of the connecting plate, an indentation structure formed between the first side plate and the second side plate; wherein a first extending element formed on the first side plate or the second side plate leans against a housing of the optical connector receptacle.

In one aspect of the present invention, the first elastic member and the second elastic member are connected to form an integrally formed structure.

In one aspect of the present invention, a partitioning groove is arranged at the second side plate, two sides of the partitioning groove respectively have a first elastic member and the first extending element, and the first elastic member leans against a side wall of the through hole. Moreover, the first elastic member has a first inclined plate, and a first pressing plate connected to an end of the first inclined plate leans against the side wall of the through hole. A second elastic member disposed on the first side plate leans against the side wall of the through hole.

In one aspect of the present invention, a partitioning groove is arranged at the first side plate, two sides of the partitioning groove respectively have a first elastic member and the first extending element, and the first elastic member leans against a side wall of the through hole. Furthermore, the first elastic member has a first inclined plate, and a first pressing plate connected to an end of the first inclined plate leans against the side wall of the through hole. A second elastic member disposed on the second side plate leans against the side wall of the through hole. The second elastic member has a second inclined plate, and a second pressing plate connected to an end of the second inclined plate leans against the side wall of the through hole.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

FIG. 2A is a three-dimensional schematic view of another embodiment of the mounting structure of the optical connector receptacle in the present invention.

FIG. 2B is a schematic view of the combination of the optical connector receptacle and the mounting structure of FIG. 2A.

DETAILED DESCRIPTION OF THE PREFERRED EMBODIMENTS

Figure 1A:
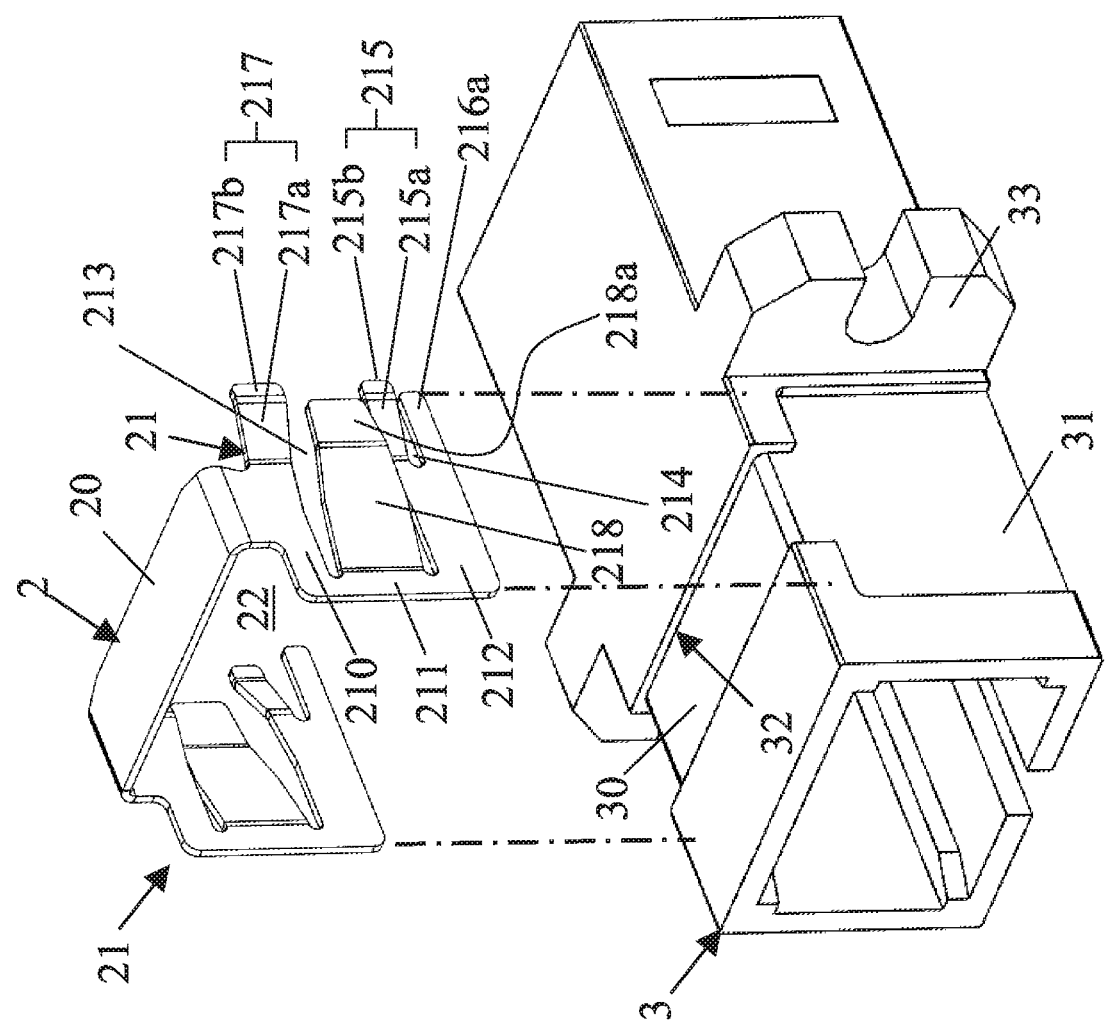
FIG. 1A is a three-dimensional schematic view of an embodiment of a mounting structure of an optical connector receptacle in the present invention.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate a receptacle structure of an optical connector and an optical communication device using the same and to aid it of skilled in the art in practicing this invention. These embodiments are merely exemplary embodiments and in no way to be considered to limit the scope of the invention in any manner.

Figure 1B:
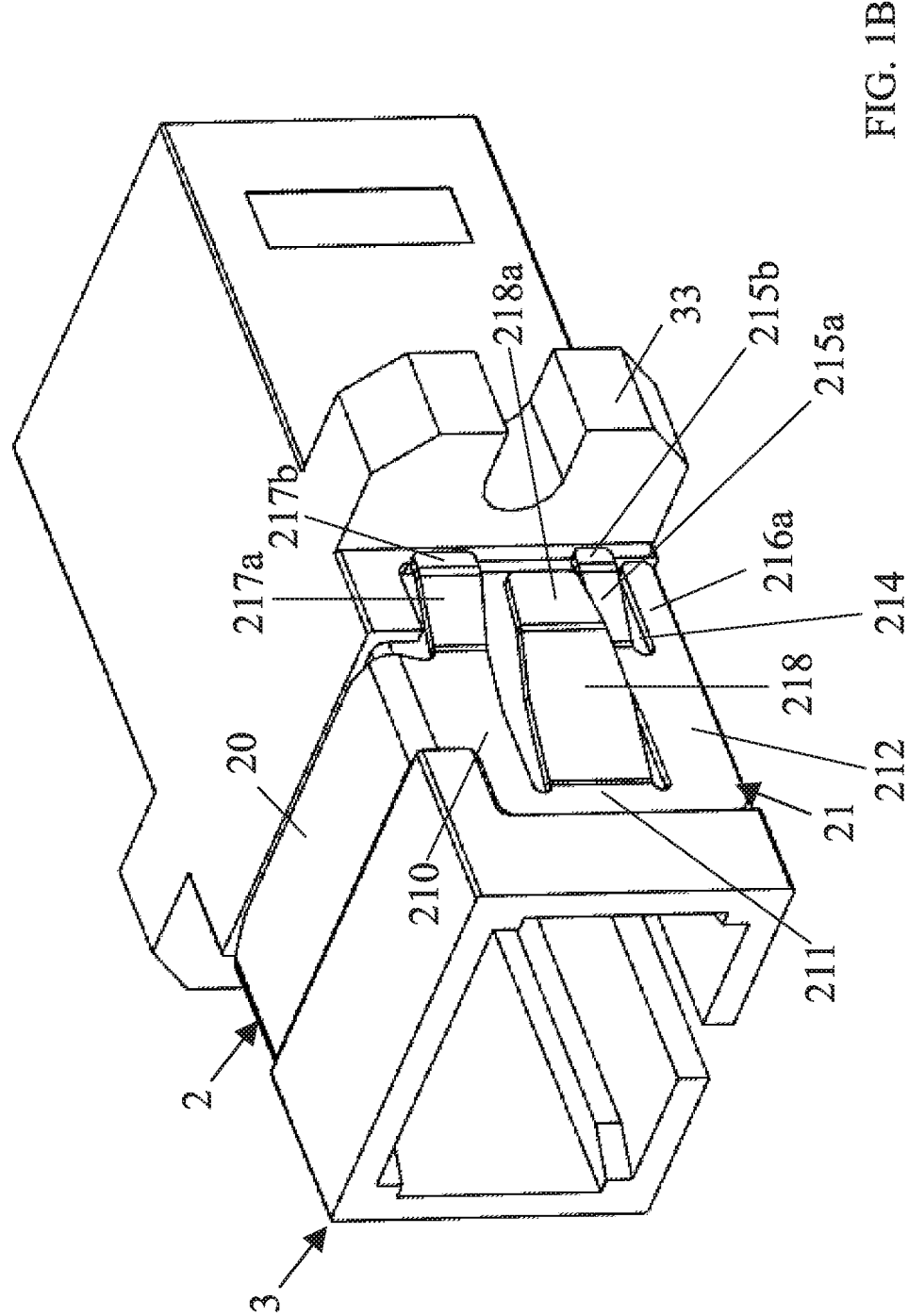
FIG. 1B is a schematic view of the combination of the optical connector receptacle and the mounting structure of FIG. 1A.

Please refer to FIGS. 1A and 1B, FIG. 1A is a three-dimensional schematic view of an embodiment of a mounting structure of an optical connector receptacle in the present invention, and FIG. 1B is a schematic view of the combination of the optical connector receptacle and the mounting structure of FIG. 1A. A mounting structure 2 of the embodiment is used for fixing an optical connector receptacle 3 into a through hole of a metal plate. The optical connector receptacle 3 has a first surface 30, and a second surface 31 respectively connected to two sides of the first surface 30. The mounting structure 2 is sleeved on the first surface 30 and the second surface 31 of the optical connector receptacle 3. In this embodiment, the first surface 30 and the second surface 31 are formed in the groove structure 32 of the optical connector receptacle 3 to restrain the mounting structure 2 so that the mounting structure 2 is stably disposed on the optical connector receptacle 3.

In the embodiment, the mounting structure 2 includes a main plate 20 and a pair of side plate portions 21. The main plate 20 leans against the first surface 30. The two side plate portions 21 are respectively connected to both sides of the main plate 20 and respectively lean against the second surface 31. In this embodiment, the sides of the main plate 20 that are not connected to the side plate portion 21 lean against the groove wall of the groove structure 32 forming the first surface 30. The main plate 20 is restrained the groove wall of the groove structure 32 so that the main plate 20 is firmly fixed in the groove structure 32.

Each side plate portion 21 further has a first side plate 210, a connecting plate 211, and a second side plate 212. The first side plate 210 is connected to the main plate 20. An end of the connecting plate 211 is connected to the first side plate 210. The second side plate 212 is connected to another end of the connecting plate 211 so that an indentation structure 213 is formed between the first side plate 210 and the second side plate 212. Wherein, the first side plate 210 or the second side plate 212 forms a first extending element 216a, which leans against the housing of the optical connector receptacle 3.

In this embodiment, the first extending element 216a is formed on the second side plate 212, and the end of the first extending element 216a leans against the groove wall of the groove structure 32. A partitioning groove 214 is arranged at the second side plate 212, and two sides of the partitioning groove 214 respectively have a first elastic member 215 and a first extending member 216a. The first elastic member 215 has a first inclined plate 215a, which extends obliquely outward from the end of the second side plate 212 at a predetermined angle, and a first pressing plate 215b is connected to an end of the first inclined plate 215a. On a side opposite to the first side plate 210 and the connecting plate 211 is a second elastic member 217, which has a second inclined plate 217a, which extends obliquely outward from the end of the first side plate 210 at a predetermined angle. A second pressing plate 217b is connected to an end of the second inclined plate 217a. Furthermore, each side plate portion 21 further has an abutment plate 218, which is disposed in the indentation structure 213. An end of the abutment plate 218 is connected to the connecting plate 211 and extends obliquely outward at a predetermined angle, and its end is folded at a predetermined angle, a stopping plate 218a is formed to correspond to the mounting side plate 33 of the optical connector receptacle 3. It should be noted that, in this embodiment, the mounting structure 2 is formed by folding a metal plate to form a main plate 20 and a side plate portion 21, and a recess space 22 is formed to be combined with the optical connector receptacle 3.

Please refer to FIGS. 2A and 2B, FIG. 2A is a three-dimensional schematic view of another embodiment of the mounting structure of the optical connector receptacle in the present invention, and FIG. 2B is a schematic view of the combination of the optical connector receptacle and the mounting structure of FIG. 2A. In this embodiment, the structure is basically similar to that of FIGS. 1A and 1B, the difference is that the end of the first side plate 210a of the mounting structure 2a of this embodiment is not identical to the second elastic member 217 of FIG. 1A. That is, the second extending element 216b extends straight to lean against the groove wall of the groove structure 32. In another embodiment, please refer to FIG. 3A, FIG. 3A is a schematic view of other embodiment of the mounting structure in the present invention. The mounting structure 2b of this embodiment is basically similar to that in FIG. 1A. The difference is that, in this embodiment, the first pressing plate 215b of the first elastic member 215 on the second side plate 212 is connected to the second pressing plate 217b extended from the second elastic member 217 on the first side plate 210 to form a connecting plate 219, so that the first elastic member 215 and the second elastic member 217 are integrally formed.

Figure 3B:
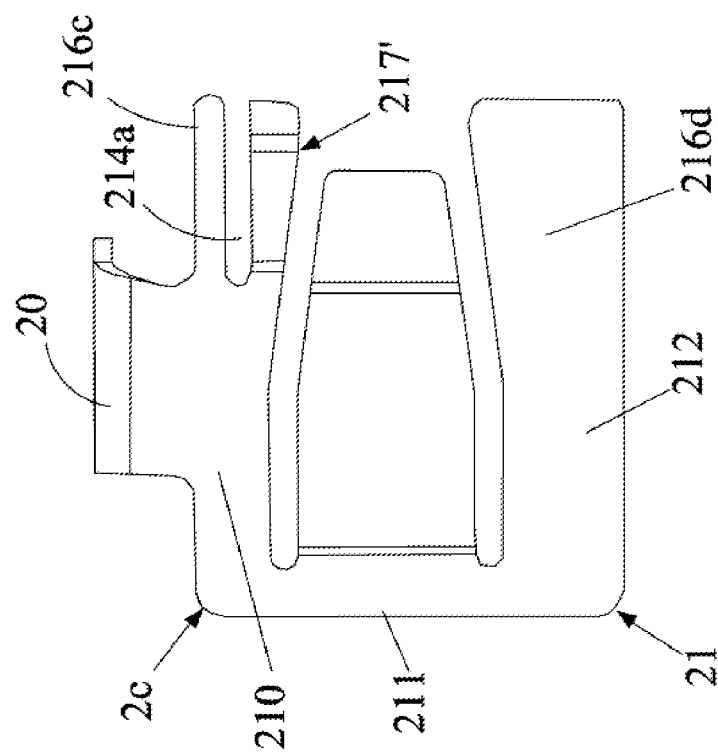
FIGS. 3A and 3B are schematic views of different embodiments of the mounting structure in the present invention.
Figure 3A:
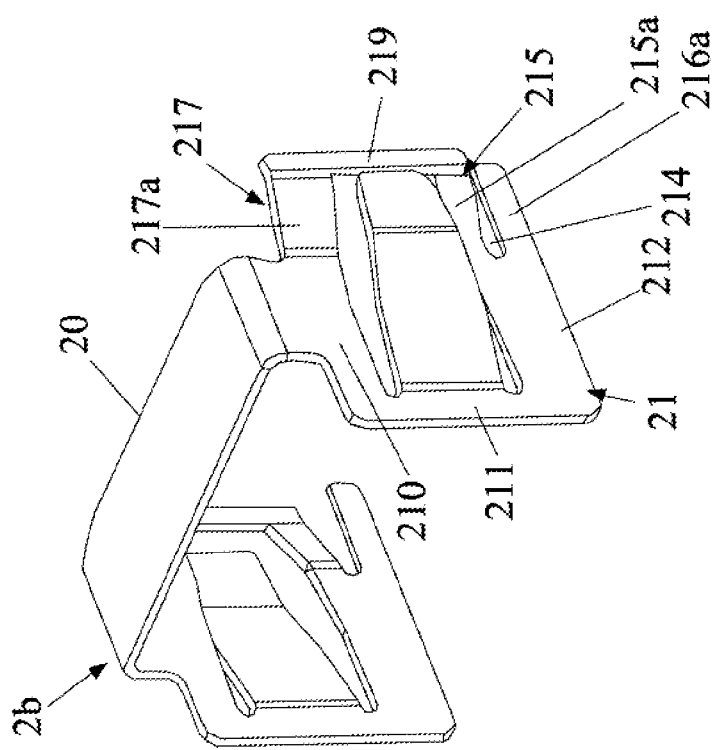

In another embodiment, please refer to FIG. 3B, FIG. 3B is a schematic view of other embodiment of the mounting structure in the present invention. In this embodiment, the difference between the mounting structure 2c and that in FIG. 1A is that, a partition groove 214a is arranged at the first side plate 210, and two sides of the partition groove 214a are the first elastic member 217' and the first extending element 216c. When the mounting structure 2c is installed on the groove structure 32 shown in FIG. 1A, the ends of the first elastic member 217' and the first extending element 216c leans against the groove wall of the groove structure 32 on the second surface 31. The second side plate 212 has a second extending element 216d, and the end of second extending element 216d also leans against the groove wall of the groove structure 32 on the second surface 31. It should be noted that although the second side plate 212 in FIG. 3B has a second extending element 216d, in another embodiment, the second extending element 216d on the second side plate 212 can also be changed to the configuration of the elastic member 215 set in FIG. 2A.

Figure 4A:
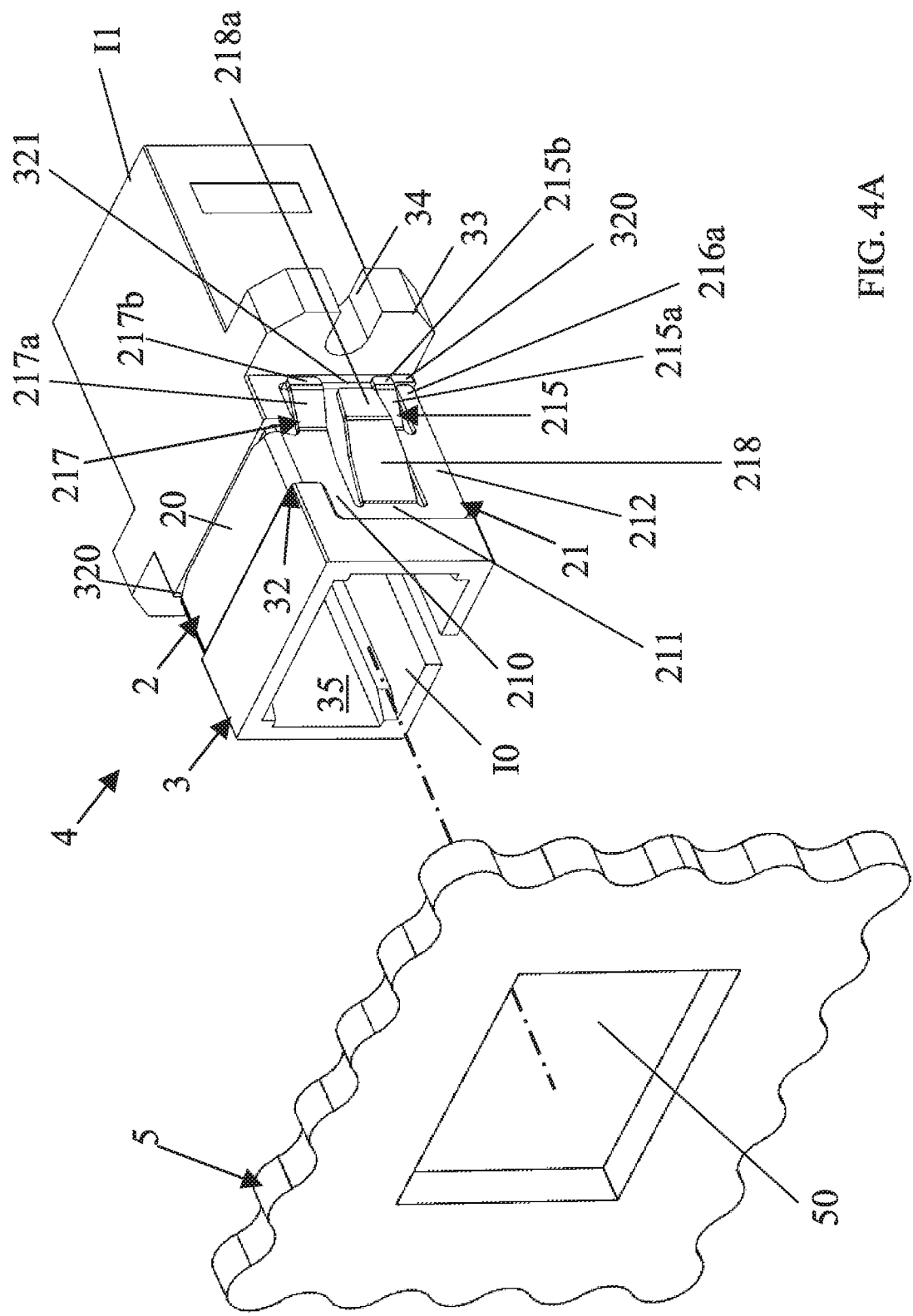
FIGS. 4A and 4B are schematic views of an embodiment of an optical connector receptacle module in the present invention.
Figure 4C:
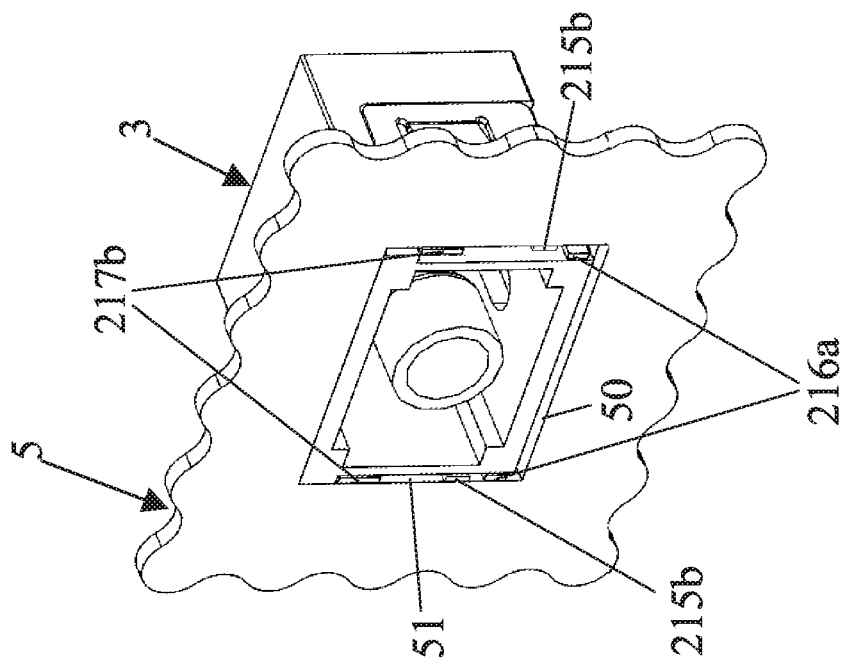
FIG. 4C is a schematic cross-sectional view of AA shown in FIG. 4B.
Figure 4B:
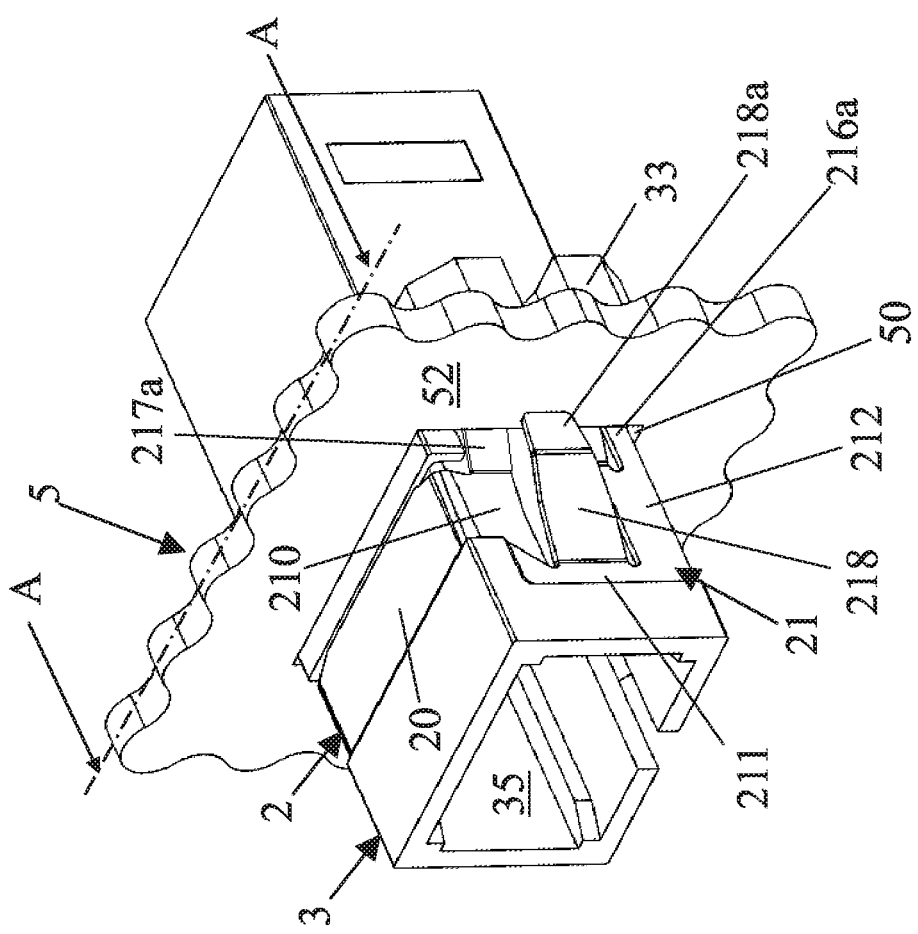

Please refer to FIGS. 4A and 4B, FIGS. 4A and 4B are schematic views of an embodiment of an optical connector receptacle module in the present invention. In this embodiment, an optical connector receptacle module 4 includes an optical connector receptacle 3 and a mounting structure 2. In this embodiment, the optical connector receptacle 3 and the mounting structure 2 are the same as those structures shown in FIGS. 1A and 1B. In other embodiments, the mounting structure may also be the structure shown in the mounting structures 2a to 2c of FIGS. 2A and 3A to 3B. In this embodiment, the first side I0 and the second side I1 of the optical connector receptacle 3 have insertion holes 35, which are inserted by the optical connector, so that the optical connectors inserted into the insertion holes 35 at the first side I0 and the second side I1 can be coupled to each other.

The mounting structure 2 is sleeved in the groove structure 32 of the optical connector receptacle 3, and is inserted into the groove structure 32, which is located at the groove body 320 on the top side of the optical connector receptacle 3, by the main plate 20. The two sides of the main plate 20 are respectively leaned against the two side walls of the groove body 320. A side of the connecting plate 211 of the side plate portion 21 of the mounting structure 2 leans against the groove wall of the side groove body 321 of the groove structure 32 on the side of the optical connector receptacle 3. The end of the first extending element 216a of the second side plate 212 leans against the groove wall of the side groove body 321 on the side of the optical connector receptacle 3. Since the end of the first extending element 216a on two sides of the mounting structure 2 symmetrically lean against the groove wall of the side groove body 321 on the side of the optical connector receptacle 3, the mounting structure 2 achieves better fixation and structure balance effect on the optical connector 3. The entire optical connector receptacle module 4 can be installed on the housing 5 of the communication device. In this embodiment, the housing 5 is a metal housing having a through hole 50, which allows the optical connector receptacle module 4 to pass through, so that the optical connector receptacle 3 can be fixed in the through hole 50 by the mounting structure 2. In this embodiment, the mounting side plates 33 extend from two sides of the optical connector receptacle 3, and each mounting side plate 33 has a positioning hole 34, which allows a fixing element, such as a screw, etc., to fix on the housing 5.

Please refer to FIGS. 4A to 4C, FIG. 4C is a schematic cross-sectional view of AA shown in FIG. 4B. In this embodiment, the second pressing plate 217b of the second elastic member 217 on the first side plate 210 leans against the frame wall 51, which constitutes the through hole 50. In addition, the first pressing plate 215b of the first elastic member 215 on the second side plate 212 leans against the frame wall 51, which constitutes the through hole 50. When not yet assembled, the first elastic member 215 and the second elastic member 217 are opened wider than the opening width of the through hole 50. As the optical connector receptacle 3 is inserted into the through hole 50, the first pressing plate 215b and the second pressing plate 217b contact with the frame wall 51, the frame wall 51 presses the first pressing plate 215b and the second pressing plate 217*b*, so that the first pressing plate 215*b* and the second pressing plate 217*b* lean against the frame wall 51. As a result, the first elastic member 215 and second elastic member 217 of the mounting structure 2 provide an average force on the housing 5, thereby generating a stable fixing effect on the optical connector 3. In addition, after the optical connector receptacle 3 is inserted into the through hole 50 for positioning, the end of the stopping plate 218*a* corresponds to the surface 52 of the housing 5. The stopping plate 218*a* can also prevent the housing 5 from falling out from an end of the optical connector 3.

Figure 5A:
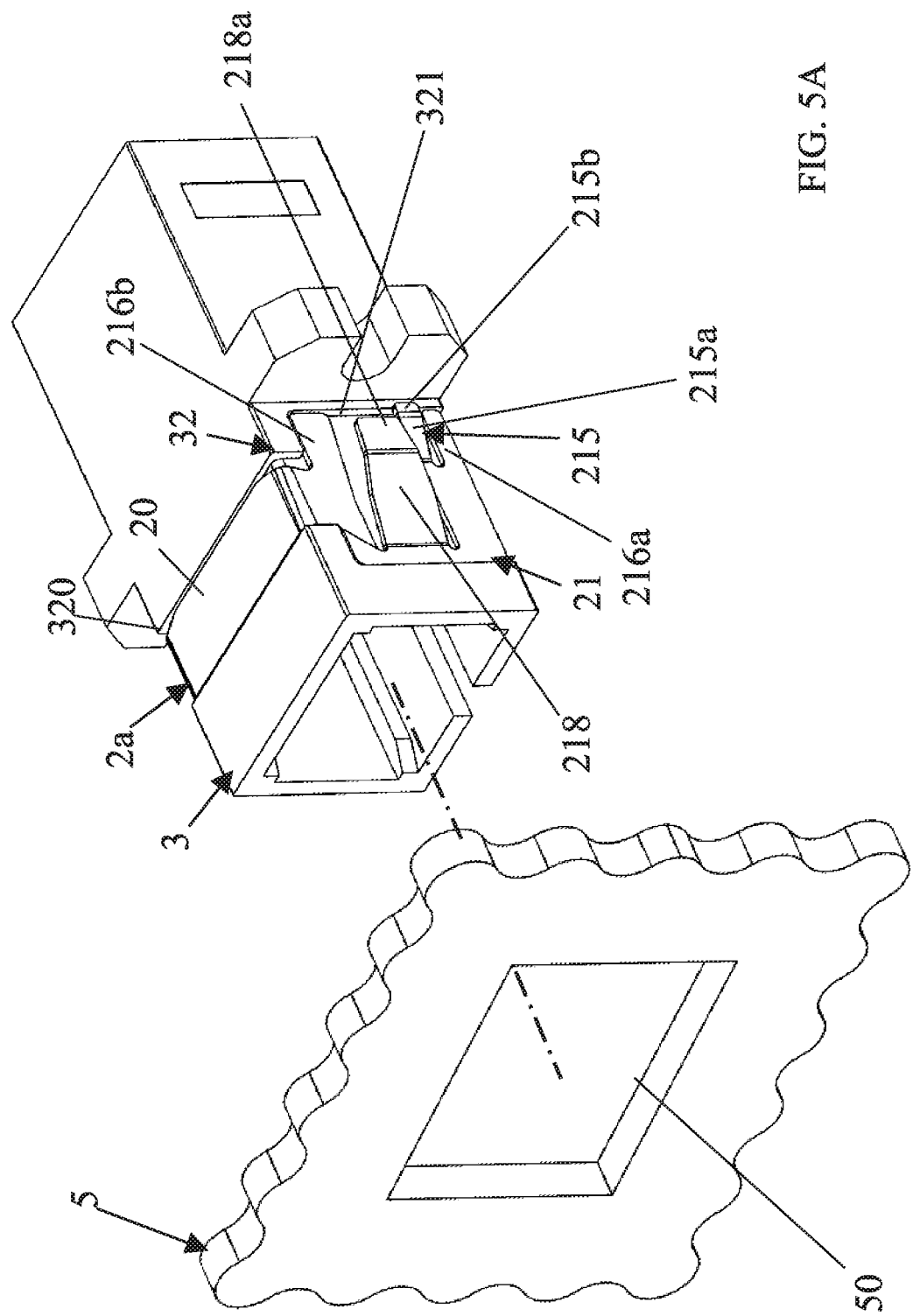
FIGS. 5A and 5B are three-dimensional schematic views and FIG. 5C is a cross-sectional view of another embodiment of the optical connector receptacle module in the present invention.
Figure 5C:
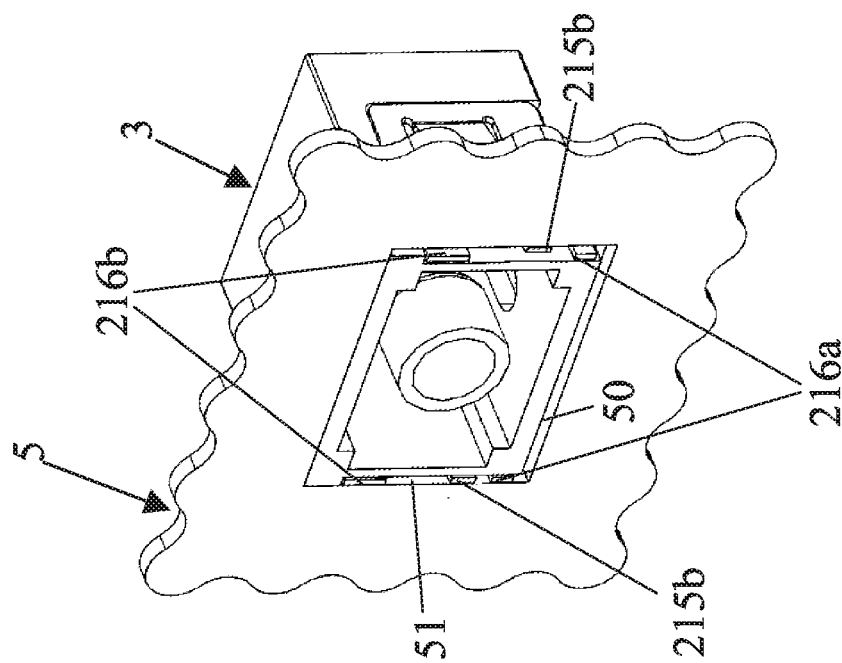
Figure 5B:
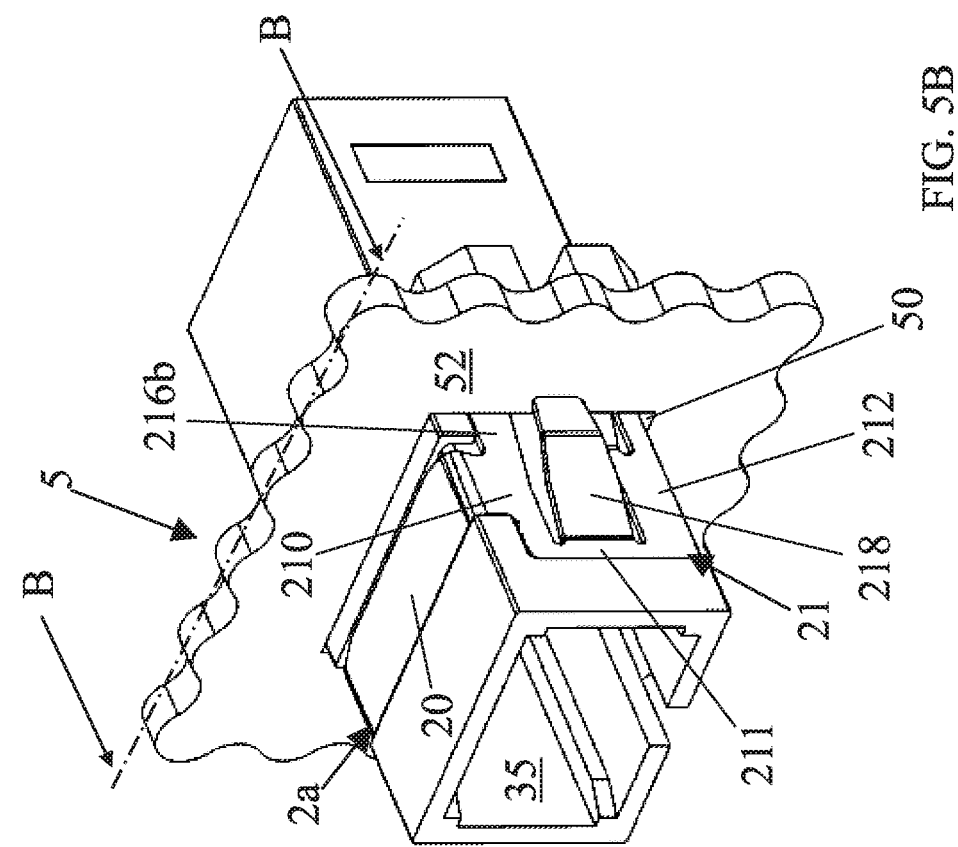

Please refer to FIGS. 5A to 5C, FIGS. 5A and 5B are three-dimensional schematic view and FIG. 5C is a cross-sectional views of another embodiment of the optical connector receptacle module in the present invention. In this embodiment, the mounting structure installed on the optical connector 3 is implemented in the embodiment shown in FIG. 2A. The entire optical connector receptacle module 4*a* can be installed on the metal housing 5 of the communication device. In this embodiment, the housing 5 has a through hole 50, which allows the optical connector receptacle module 4*a* to pass through, so that the optical connector receptacle 3 can be fixed in the through hole 50 by the mounting structure 2*a*. In this embodiment, the mounting side plates 33 are extended from two sides of the optical connector receptacle 3, and each mounting side plate 33 has a positioning hole 34, which allows the fixing element, such as screws, etc., to fix on the housing 5.

In this embodiment, the end of the second extending element 216*b* on the first side plate 210 directly leans against the groove wall of the side groove body 321 of the groove structure 32 on the side of the optical connector receptacle 3. Moreover, the first pressing plate 215*b* of the first elastic member 215 on the second side plate 212 leans against the frame wall 51, which constitutes the through hole 50. When not yet assembled, the first elastic member 215 is opened wider than the opening width of the through hole 50. As the optical connector receptacle 3 is inserted into the through hole 50, the first pressing plate 215*b* contacts with the frame wall 51, the frame wall 51 presses the first pressing plate 215*b*, so that the first pressing plate 215*b* leans against the frame wall 51. As a result, the first elastic member 215 of the mounting structure 2 provides an average force on the housing 5, thereby generating a stable fixing effect on the optical connector 3. In addition, after the optical connector receptacle 3 is inserted into the through hole 50 for positioning, the end of the stopping plate 218*a* corresponds to the surface 52 of the housing 5. The stopping plate 218*a* can also prevent the housing 5 from falling out from an end of the optical connector 3.

In summary, the present invention embeds the optical connector receptacle into the through hole of the housing of the communication device by the mounting structure, wherein the mounting structure leans against the groove wall of the optical connector receptacle through the first extending element piece 216*a* and/or the second extending element 216*b*, thereby generating a stable support effect. In addition, the mounting structure also generates a force acting on the side wall of the through hole of the housing through the first elastic member 215 and/or the second elastic member 217, thereby providing an average force to the optical connector receptacle, and generating a stable fixing effect It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. A mounting structure of an optical connector receptacle, for fixing the optical connector receptacle into a through hole of a metal plate, the optical connector receptacle comprises a first surface, and second surfaces respectively connected to two sides of the first surface, the mounting structure comprising:
a main plate, being in contact with the first surface; and
a pair of side plate portions, connected to two sides of the main plate respectively, the pair of side plate portions being in contact with the second surface, each the side plate portion comprising:
a first side plate, connected to the main plate;
a connecting plate, an end of the connecting plate connected to the first side plate; and
a second side plate, connected to another end of the connecting plate, an indentation structure formed between the first side plate and the second side plate;
wherein a first extending element formed on the first side plate or the second side plate is in contact with a housing of the optical connector receptacle, and the entire first extending element is in contact with the second surface.

2. The mounting structure of claim 1, wherein a partitioning groove is arranged at the second side plate, two sides of the partitioning groove respectively have a first elastic member and the first extending element, and the first elastic member is in contact with a side wall of the through hole.

3. The mounting structure of claim 2, wherein the first elastic member has a first inclined plate, and a first pressing plate connected to an end of the first inclined plate is in contact with the side wall of the through hole.

4. The mounting structure of claim 3, wherein a second elastic member disposed on the first side plate is in contact with the side wall of the through hole.

5. The mounting structure of claim 4, wherein the second elastic member has a second inclined plate, and a second pressing plate connected to an end of the second inclined plate is in contact with the side wall of the through hole.

6. The mounting structure of claim 4, wherein the first elastic member and the second elastic member are connected to form an integrally formed structure.

7. The mounting structure of claim 2, wherein the first side plate has a second extending element, which is in contact with the housing of the optical connector receptacle by the through hole.

8. The mounting structure of claim 1, wherein the each side plate portion has an abutment plate, which is disposed in the indentation structure, an end of the abutment plate is connected to the connecting plate, and another end of the abutment plate is in contact with the metal plate.

9. The mounting structure of claim 1, wherein a partitioning groove is arranged at the first side plate, two sides of the partitioning groove respectively have a first elastic member and the first extending element, and the first elastic member is in contact with a side wall of the through hole.

10. The mounting structure of claim 9, wherein the first elastic member has a first inclined plate, and a first pressing plate connected to an end of the first inclined plate is in contact with the side wall of the through hole.

11. The mounting structure of claim 10, wherein a second elastic member disposed on the second side plate is in contact with the side wall of the through hole.

12. The mounting structure of claim 11, wherein the second elastic member has a second inclined plate, and a second pressing plate connected to an end of the second inclined plate is in contact with the side wall of the through hole.

13. The mounting structure of claim 11, wherein the first elastic member and the second elastic member are connected to form an integrally formed structure.

14. The mounting structure of claim 9, wherein the second side plate has a second extending element, which is in contact with the housing of the optical connector receptacle by the through hole.

15. An optical connector receptacle module, comprising:
an optical connector receptacle, having a first surface, and second surfaces respectively connected to two sides of the first surface;
a mounting structure, fixed the optical connector receptacle into a through hole of a metal plate, the mounting structure having a main plate and a pair of side plate portions, the main plate being in contact with the first surface, and the pair of side plate portions respectively connected to two sides of the main plate and being in contact with the second surface, each the side plate portion comprising:
a first side plate, connected to the main plate;
a connecting plate, an end of the connecting plate connected to the first side plate; and
a second side plate, connected to another end of the connecting plate, an indentation structure formed between the first side plate and the second side plate;
wherein a first extending element formed on the first side plate or the second side plate is in contact with a housing of the optical connector receptacle, and the entire first extending element is in contact with the second surface.

16. The optical connector receptacle module of claim 15, wherein a partitioning groove is arranged at the second side plate, two sides of the partitioning groove respectively have a first elastic member and the first extending element, and the first elastic member is in contact with a side wall of the through hole.

17. The optical connector receptacle module of claim 16, wherein the first elastic member has a first inclined plate, and a first pressing plate connected to an end of the first inclined plate is in contact with the side wall of the through hole.

18. The optical connector receptacle module of claim 17, wherein a second elastic member disposed on the first side plate is in contact with the side wall of the through hole.

19. The optical connector receptacle module of claim 18, wherein the second elastic member has a second inclined plate, and a second pressing plate connected to an end of the second inclined plate is in contact with the side wall of the through hole.

20. The optical connector receptacle module of claim 18, wherein the first elastic member and the second elastic member are connected to form an integrally formed structure.

21. The optical connector receptacle module of claim 16, wherein the first side plate has a second extending element, which is in contact with the housing of the optical connector receptacle by the through hole.

22. The optical connector receptacle module of claim 15, wherein the each side plate portion has an abutment plate, which is disposed in the indentation structure, an end of the abutment plate is connected to the connecting plate, and another end of the abutment plate is in contact with the metal plate.

23. The optical connector receptacle module of claim 15, wherein a partitioning groove is arranged at the first side plate, two sides of the partitioning groove respectively have a first elastic member and the first extending element, and the first elastic member is in contact with a side wall of the through hole.

24. The optical connector receptacle module of claim 23, wherein the first elastic member has a first inclined plate, and a first pressing plate connected to an end of the first inclined plate is in contact with the side wall of the through hole.

25. The optical connector receptacle module of claim 24, wherein a second elastic member disposed on the second side plate is in contact with the side wall of the through hole.

26. The optical connector receptacle module of claim 25, wherein the second elastic member has a second inclined plate, and a second pressing plate connected to an end of the second inclined plate is in contact with the side wall of the through hole.

27. The optical connector receptacle module of claim 25, wherein the first elastic member and the second elastic member are connected to form an integrally formed structure.

28. The optical connector receptacle module of claim 23, wherein the second side plate has a second extending element, which is in contact with the housing of the optical connector receptacle by the through hole.

* * * * *